United States Patent
Wilde et al.

(10) Patent No.: US 12,001,256 B2
(45) Date of Patent: Jun. 4, 2024

(54) JOB AGENT-BASED POWER-CAPPING OF SYSTEMS

(71) Applicant: HEWLETT PACKARD ENTERPRISE DEVELOPMENT LP, Houston, TX (US)

(72) Inventors: Torsten Wilde, Berlin (DE); Christian Simmendinger, Boeblingen (DE); Tobias W. W. Schiffmann, Boeblingen (DE)

(73) Assignee: Hewlett Packard Enterprise Development LP, Spring, TX (US)

( * ) Notice: Subject to any disclaimer, the term of this patent is extended or adjusted under 35 U.S.C. 154(b) by 584 days.

(21) Appl. No.: 17/195,864

(22) Filed: Mar. 9, 2021

(65) Prior Publication Data

US 2022/0291734 A1    Sep. 15, 2022

(51) Int. Cl.
  *G06F 9/50*    (2006.01)
  *G06F 1/3203*  (2019.01)
  *G06F 9/48*    (2006.01)
  *G06N 20/00*   (2019.01)

(52) U.S. Cl.
  CPC .......... *G06F 1/3203* (2013.01); *G06F 9/4893* (2013.01); *G06F 9/5027* (2013.01); *G06N 20/00* (2019.01); *G06F 2209/501* (2013.01)

(58) Field of Classification Search
  CPC .... G06F 1/3203; G06F 9/4893; G06F 9/5027; G06F 2209/501; G06F 1/3234; G06F 1/329; G06F 11/3062; G06F 11/3409; G06N 20/00; Y02D 10/00
  See application file for complete search history.

(56) References Cited

U.S. PATENT DOCUMENTS

| | | | |
|---|---|---|---|
| 9,575,539 B2* | 2/2017 | Kansal | G06F 1/3206 |
| 9,715,264 B2 | 7/2017 | Ghose | |
| 2015/0261274 A1* | 9/2015 | Ahnn | G06F 1/3212 713/340 |
| 2016/0357241 A1* | 12/2016 | Ramadoss | G06F 1/3293 |

(Continued)

OTHER PUBLICATIONS

Corbalan, Julita. Brochard. Luigi; "EAR: Energy Management Framework for Supercomputers"; www.bsc.es/sites/default/files/public/bscw2/content/software-app/technical-documentation/ear.pdg; retrieved on Mar. 4, 2021; 10 pp.

(Continued)

*Primary Examiner* — Dong U Kim
(74) *Attorney, Agent, or Firm* — Trop, Pruner & Hu, P.C.

(57) ABSTRACT

A technique includes an agent executing on a plurality of nodes while a job is being concurrently executed by the plurality of nodes. The plurality of nodes is power-capped by an existing node power consumption budget. The technique includes managing power consumption of the plurality of nodes. The managing includes the agent determining a performance footprint that is associated with execution of the job; and the managing includes the agent determining a second node power consumption budget based on the performance footprint. The second node power consumption budget is different than the existing node power consumption budget. The managing includes the agent providing a power consumption request to a global power dispatcher to set a new node power consumption budget for the plurality of nodes.

21 Claims, 6 Drawing Sheets

(56) References Cited

U.S. PATENT DOCUMENTS

| | | | |
|---|---|---|---|
| 2018/0077228 A1* | 3/2018 | Blagodurov | H04L 45/30 |
| 2019/0286223 A1* | 9/2019 | Furman | G06F 1/3287 |
| 2020/0042068 A1* | 2/2020 | Rong | G06F 1/3203 |
| 2020/0133707 A1* | 4/2020 | Coster | G06F 1/329 |
| 2020/0166984 A1* | 5/2020 | Reddy | G06F 11/3419 |
| 2020/0294181 A1* | 9/2020 | Matam | H01L 25/18 |
| 2021/0232200 A1* | 7/2021 | King | G06F 9/4893 |

OTHER PUBLICATIONS

GEOPM "Global Extensible Open Power Manager"; https://geopm.github; retrieved on Mar. 4, 2021; 3 pp.

Martin, Steven J., et al.; "Cray Advanced Platform Monitoring and Control (CAPMC)"; Cray User Group (CUG) Conference; Chicago, IL; Apr. 30, 2015; 10 pp.

Patki, T. et al., Exploring Hardware Overprovisioning in Power-Constrained, High Performance Computing, ICS '13: Proceedings of the 27th international ACM conference on International conference on supercomputing, Jun. 2013, 10 pp.

Sarood, O. et al., Maximizing Throughput of Overprovisioned HPC Data Centers Under a Strict Power Budget, (Research Paper), Conference: Proceedings of the International Conference for High Performance Computing, Networking, Storage and Analysis, Nov. 2014, 12 pp.

Wang, B. et al., Dynamic Application-aware Power Capping, Energy Efficient Supercomputing (E2SC '17), Nov. 12-17, 2017, Denver CO 8 pp.

Website (http://hpcpowerstack.github.io): "The HPC PowerStack, A path to Standardization and/or Homogenization?"; retrieved on Mar. 4, 2021; 3 pp.

U.S. Appl. No. 16/863,217, entitled "Systems and Methods for Reducing Stranded Power Capacity"; filed Apr. 30, 2020; 33 pp.

* cited by examiner

JOB AGENT-BASED POWER-CAPPING OF SYSTEMS

BACKGROUND

A cluster is a group of interconnected computers, or compute nodes, which combine their individual processing powers to function as a single, high performance machine. A cluster may be used for a number of different purposes, such as load balancing, high availability (HA) server applications and parallel processing. The compute nodes may be furnished by hardware (e.g., rack-based server blades) of a data center. The ever-increasing number of compute nodes has resulted in an ever-increasing power burden on data centers.

DETAILED DESCRIPTION

Due to the ever-increasing power burden on data centers, the capital expenditures and operating expenditures for the data centers are being pushed higher and higher. For purposes of mitigating the power burden on a data center, the data center's power envelope may be constrained, or capped, to create an "overprovisioned system." In this context, an "overprovisioned system" generally refers to a power-limited system (or "power-capped system"), which has a total power capacity that is less than the maximum collective power demand of all its power consuming resources, i.e., the summation of the thermal design power (TDP) of all of the power consuming resources of the system exceeds the system's total power capacity. At a given time, some of the power consuming components of a system are idle or operating below their respective TDPs. An overprovisioned system uses power-capping and load shedding to exploit the difference between the total power requirements of its compute resources and the real peak power consumption of the compute resources for purposes of incorporating all of the compute resources in the same power envelope.

One way to manage power in an overprovisioned system is to limit, or cap, the amount of power that may be used by each compute node of the system. Here, a "node" generally refers to a unit of processing resources, such as multiple processing cores that execute an operating system instance, as further described herein. A "compute node" refers to a node that acts on data and/or instructions as part of a unit of work, or job, for an application. In a uniform node power-capping scheme in which the power cap of each compute node is the same, extrapolated historical power consumption measurements may be used to derive the node power cap. A challenge with uniform node power-capping, however, is that this approach does not consider application execution performance, and accordingly, significant application performance penalties may be incurred that reduce or even negate the benefits of the power-capping.

In accordance with example implementations that are described herein, application performance-specific power management is used in an overprovisioned system, which substantially reduces, if not eliminates, the impact on application performance, as compared to traditional power-capping schemes. More specifically, in accordance with some implementations, compute nodes of an overprovisioned system (e.g., an overprovisioned system that is associated with a High Performance Computing (HPC) cluster) may be separated, or partitioned, into a number of power domains. The compute nodes of each power domain receive their power from a corresponding power pool. A global power dispatcher of the overprovisioned system allocates power caps, or "budgets," to each power domain based on a total system power budget. The global power dispatcher may further establish, in accordance with example implementations, a job power budget, or cap, for each job in a particular domain, depending on the number of active jobs and any reserves associated with the corresponding power pool. In accordance with example implementations, runtime power aware agents manage the available power for the nodes that execute the jobs.

More specifically, in accordance with example implementations, for each job, a runtime power aware agent concurrently executes on the nodes that execute the job. The agent, over time, determines performance profiles, or footprints, for the application that corresponds to the job based on observed characteristics, or features, relating to the execution of the job on the nodes. In this context, the "performance footprint" (which may also be referred to as a "performance profile," a "footprint," or a "profile") characterizes the category, or type, of the application that is associated with the job as well as categorizes the particular stage (e.g., an input stage, a processing stage, an output stage, and so forth) of the application, which may change over time.

In accordance with example implementations, for each footprint, the agent determines and sets an optimal node processing frequency (also called a "sweet spot frequency"). For example, the agent sets the central processing unit (CPU) core frequencies of each of the nodes to the optimal node processing frequency. In this context, the "optimal node processing frequency" refers to a processing core at which the nodes of the job maximize the number of executed instructions per unit of power (e.g., maximize the number of executed instructions per Watt).

As a newly-determined optimal node processing frequency may be associated with an increased or decreased node power load, the agent, in accordance with example implementations, may communicate with the global power dispatcher, as appropriate, to request an increase to the existing job power cap (i.e., to receive more power from the corresponding power pool) or to request a decrease to the existing job power cap (i.e., to return power to the power pool so more power is available for other jobs).

Among its potential advantages, the job-aware power-capping scheme closes the performance gap between a simple power-capping mechanism and unrestricted power availability. Accordingly, power availability may be managed in an overprovisioned system in a way that reduces, if not eliminates, the impact on application performance.

Figure 1:
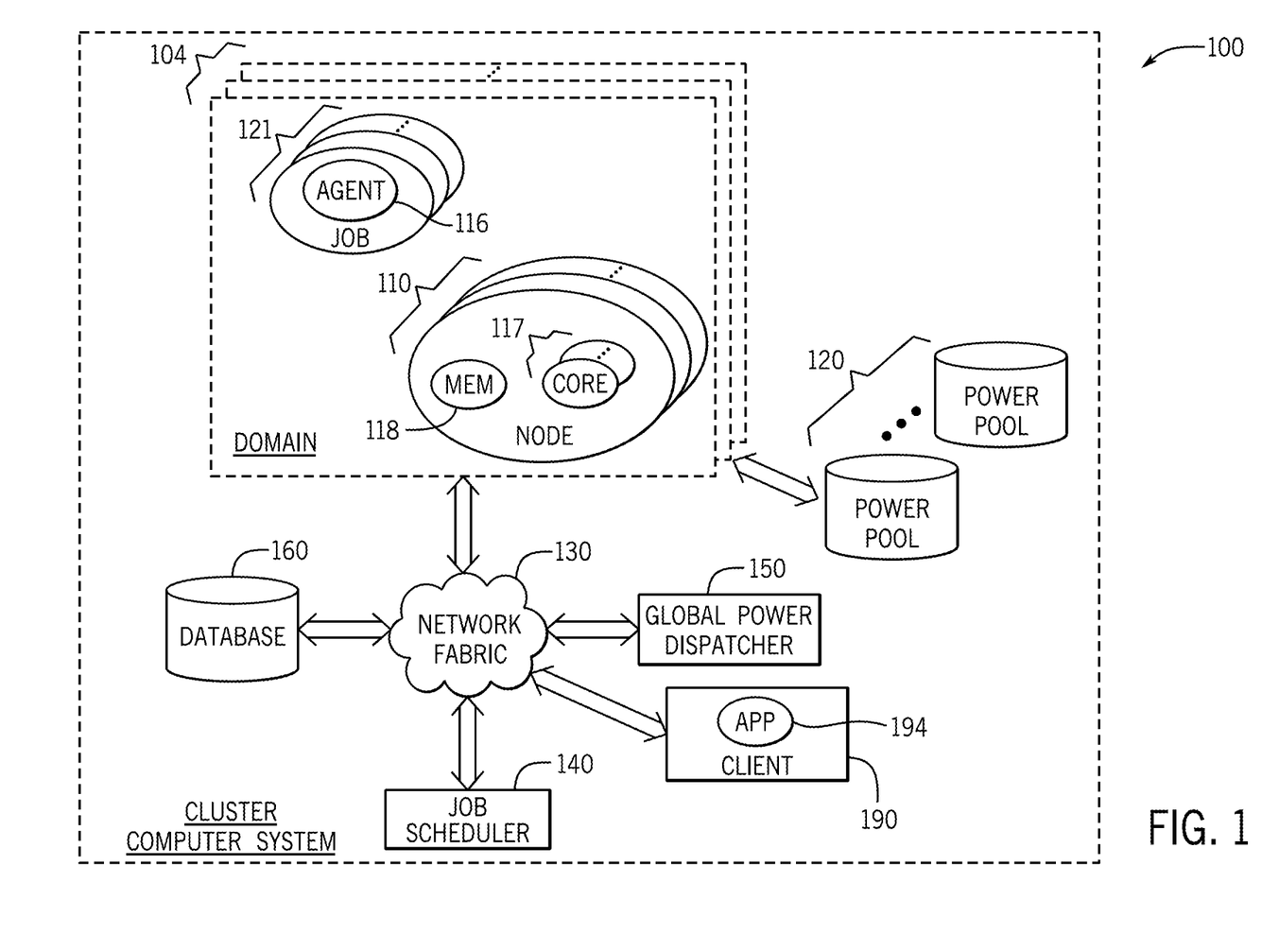
FIG. 1 is a schematic diagram of a cluster computer system that includes a global power dispatcher and application power aware runtime agents to perform node power management according to an example implementation.

Referring to FIG. 1, in accordance with example implementations, a cluster computer system 100 may include various nodes 110, such as compute nodes; administrative nodes; and various other nodes, such as data transfer nodes, storage nodes, and so forth. In this context, a "node" refers to an entity that includes one or multiple processing cores (e.g., central processing unit (CPU) cores, graphics processing unit (GPU) cores, field programmable gate arrays (FPGAs), or other node accelerator cores) and corresponds to a single operating system (OS) instance. In accordance with example implementations, a node may be considered a server. A node may be formed from all or part of an actual, physical machine; and the node may include and/or correspond to one or multiple virtual components (e.g., virtual machines) or virtual environments (e.g., containers) of a physical machine.

As a more specific example, in accordance with some implementations, a node may be formed from one or multiple processing cores of a server blade. In accordance with further implementations, a node may be formed from one or multiple processing cores that are part of a hardware platform other than a server blade, such as a non-rack mounted platform, a rack-mounted server, and so forth. Regardless of its particular form, in accordance with example implementations, a given node 110 is associated with one or multiple processing cores 117 (e.g., CPU processing cores, GPU processing cores, FPGAs, and so forth) and a memory 118. The memory 118 is a non-transitory storage medium that may be formed from semiconductor storage devices, memristor-based storage devices, magnetic storage devices, phase change memory devices, a combination of one or more of these storage technologies, and so forth. Moreover, the memory 118 may represent a combination of different storage types, such as a volatile memory and/or a non-volatile memory. In general, the memory 118 may store machine-executable instructions, such as instructions that are associated with a job 121 (described below), an agent 116 (described below), and so forth. In accordance with example implementations, the memory 118 may further store data, such as data associated with, used by, or produced by the executed instructions.

In accordance with example implementations, the nodes 110 may communicate among themselves as well as communicate with other components of the cluster computer system 100 via network fabric 130. In general, the network fabric 130 may be associated with one or multiple types of private and/or public communication networks, such as (as examples) Fibre Channel networks, iSCSI networks, ATA over Ethernet (AoE) networks, HyperSCSI networks, Gen-Z fabrics, dedicated management networks, local area networks (LANs), wide area networks (WANs), global networks (e.g., the Internet), wireless networks, or any combination thereof.

In accordance with example implementations, the cluster computer system 100 is, in the context of power availability for the nodes 110, an overprovisioned, or power constrained (or "power-capped"), system. In other words, the total power available for the nodes 110 is less than the summation of the TDP for all of the nodes 110. In accordance with example implementations, a global power dispatcher 150 of the cluster computer system 100 controls the overall system power limit, or "system power cap." The global power dispatcher 150 apportions power according to partitions called "power domains 104." In accordance with example implementations, each power domain 104 receives its power from an associated "power pool 120," which refers to an available amount of power. In general, for each power domain 104, the global power dispatcher 150 may allocate power to the domain 104 from its associated power pool 120, with the power budgets for the power pools 120 being equal to the system power cap, less a power reserve.

In general, groups of the nodes 110 may execute various jobs 121 for applications. In general, the nodes 110 of a given power domain 104 may, at any one time, be executing multiple jobs 121, such that different groups of the nodes 110 are executing different corresponding jobs 121.

In general, a "job" refers to an organization of work that is associated with a particular application and is assigned to a group of nodes 110 by a job scheduler 140. A message passing interface (MPI) job is an example of a "job." A given job 121 may be divided into a set of ranks (e.g., MPI ranks), or processes. Each rank of a given job 121 may be processed in parallel with the other ranks of the job 121. The job scheduler 140 schedules, or assigns, the ranks of each job 121 to a particular set of nodes 110. The job scheduler 140 may schedule groups of jobs 121 at one time, such as, for example, a batch of jobs that are present in a job batch queue of the scheduler 140. In general, the job scheduler 140 may schedule jobs 121 on a particular group of nodes 110 that are idle or will be idle when processing of the jobs 121 begins pursuant to a particular job scheduling policy. FIG. 1 depicts an example client 190 that executes an application 194. As part of its execution, the application 194 may schedule the ranks of various jobs 121 using the job scheduler 140.

In accordance with example implementations, the job scheduler 140 requests an allocation of power, or a power budget, from the global power dispatcher 150 when making scheduling decisions. In other words, in accordance with example implementations, the job scheduler 140 may determine an initial power budget for a job. These requests may be, in accordance with example implementations, serialized through the global power dispatcher 150. In accordance with example implementations, the global power dispatcher 150 takes into account the available power from the associated power pool 120 when assigning the power budget for a particular job 121. In accordance with some implementations, in determining the power budget for a job 121, the global power dispatcher 150 considers the worst-case power consumption per node 110 for the job 121. For example, the worst-case power consumption per node 110 may be pre-measured by a "power virus," such as, for example, software (e.g., software in the LINPACK library) that measures benchmarks.

As depicted in FIG. 1, in accordance with example implementations, each job 121 is associated with an agent 116. In accordance with example implementations, the agent 116 is an application power aware runtime agent, which has one instance per job 121 and executes on the nodes 110 that are executing the job 121. In this context, an "instance" of the agent 116 refers to a distributed instance of the agent 116 across the nodes 110 executing the job 121, as further described herein. In general, in accordance with example implementations, the agent 116 monitors the runtime performance of the job 121 by observing features of the nodes 110 executing the job 121; assesses a performance profile, or footprint, of the corresponding application based on the observed features; and manages the power allocated to the job 121 based on the footprint. As described herein the "footprint" may include a classification of the application and a classification of the particular stage of the application. Moreover, in accordance with example implementations, the agent 116 determines specific node processing core frequency "sweet spots" (called "optimal node processing frequencies" herein) based on the footprint. The determination of the node processing frequency for a particular job 121 may involve the agent 116 requesting additional power from the corresponding power pool 120 via a request to the global power dispatcher 150 or may involve the agent 116 returning power to the power pool 120 via a corresponding power decrease request to the global power dispatcher 150.

In accordance with example implementations, a given job 121 may be associated with a single power domain 104 or may be associated with multiple power domains 104. The global power dispatcher 150, in accordance with example implementations, considers the power budgets for all power domains 104 when considering a power allocation request (also called a "power consumption request" herein) from an agent 116 to for an increased or decreased power budget for the corresponding job. The global power dispatcher 150 may, for example, allocate part of a job power budget from multiple power pools 120, i.e., a given job 121 may be associated with one or multiple power domains 104.

In accordance with example implementations, the agent 116 may perform load balancing by shifting available power across the nodes 110 for the job 121 within the currently established power budget for the job 121. In general, power requests submitted by the agent 116, as well as power requests submitted by the job scheduler 140 and other agents 116, may be serialized through the global power dispatcher 150.

As also depicted in FIG. 1, in accordance with some implementations, the cluster computer system 100 may include a database 160. In accordance with example implementations, the database 160 may store information correlating, or indexing, a particular performance footprint (e.g., an application classification and an application stage classification) to a particular optimal node processing frequency. As described further herein, the agent 116 may, based on the determined footprint access a table of the database 160, and using the performance footprint as an index, identify a particular optimal node processing frequency. The database 160 may be populated with the information correlating the footprints to the optimal node processing frequencies in many different ways, depending on the particular implementation.

As a more specific example, in accordance with some implementations, machine learning may be applied in a test system in which different applications execute, and each of the applications may transition through different stages (e.g., input stages, output states, processing stages, and so forth). Moreover, during the executions of the applications, the node processing frequency may be varied. During the execution of the applications, performance features (e.g., node power consumption, cache misses, translation lookaside buffer (TLB) misses) may be observed. These performance features provide a feature set for the machine learning algorithm. The machine learning may be, for example, a clustering-based supervised machine learning, which determines clusters, or groups, which correspond to different application classification and application stage classifications. By observing the number of instructions executed per Watt, the optimal node processing frequency (i.e., the frequency corresponding to the maximum number of instructions per Watt) for each cluster may be identified.

In accordance example implementations, the agent 116 may apply a clustering-based machine learning algorithm to identify a cluster (i.e., a performance profile, or footprint) for an application based on various observed performance features on the nodes 110. a corresponding performance footprint. Using the identified cluster, the agent 116 may retrieve the corresponding optimal node processing frequency from the database 160.

In accordance with example implementations that are described herein, the nodes 110 are contained within one or multiple rack-based computer systems, or "racks." The racks of the cluster computer system 100 may be located in one or multiple data centers. In general, a rack may have modular cartridges, or chassis units, which are mounted to frame members of the rack; and the chassis units are located in an interior space that is defined by the frame members. A given chassis unit may contain any of a number of different computer components and serve any of a number of different purposes. As examples, a given chassis unit may be a compute server; an application server; a storage server; an edge processing server; a blade enclosure; an enclosure containing tray-mounted server nodes; and so forth. In accordance with example implementations that are described herein, a given rack contains chassis units that contains nodes 110 of the cluster 100. Depending on the particular implementation, a given rack may contain chassis units, other than chassis units that contain the nodes 110 of the cluster computer system 100. As a more specific example, in accordance with some implementations, a chassis unit of a rack may be a server blade enclosure that has slots (e.g., eight slots) to receive a number (e.g., eight) of corresponding server blades, and each server blade may contain a number (e.g., four) of the nodes 110.

In accordance with some implementations, the rack may have one or multiple power distribution units (PDUs). The PDU, in general, conditions and distributes power to the components of the rack. The PDU may, for example, contain circuitry to receive three phase NC power and convert the three phase NC power to single phase AC power to the chassis units, which convert the AC power into DC power (via AC-to-DC power supplies or high power DC rectifiers) and distribute the DC power to the chassis unit backplane. In accordance with further example implementations, a PDU may convert AC power into DC power, condition DC power, distribute DC power, and so forth.

In accordance with some implementations, the power pools 120 may correspond to different segments, or portions, of the overall power supply for a data center. For example, in accordance with some implementations, a given power pool 120 may correspond to one or multiple PDUs (e.g., a PDU of a rack that contains multiple PDUs, PDUs of the same rack, a PDU that supplies power to an entire rack, PDUs of multiple racks, and so forth). In accordance with further implementations, a particular power pool 120 may not correspond to a PDU.

In accordance with example implementations, the job scheduler 140 uses power as a schedulable resource. The available power budget for scheduling jobs 121 is determined by the global power dispatcher 150. When considering scheduling a particular job 121, the job scheduler 140 determines an initial budget for the job 121 by multiplying the number of job-requested nodes by a predefined power value. The power value may be, as examples, the maximum node power consumption benchmarked, a minimum node power consumption, or something in between. The job scheduler 140 schedules a given job if the determined initial budge for the job 121 fits into the available power budget that is provided by the global power dispatcher 150. With each job 121 scheduled, the global power dispatcher 105 reduces the available power budget until sufficient power is unavailable to schedule any more jobs 121 in the available power budget. The global power dispatcher 150 refills, or increases, the available power budget in response to an agent 116 returning excess power during runtime of a job 121 and when the job 121 finishes. The global power dispatcher 150 reduces the available power budget every time a job 121 is scheduled; and the global power dispatcher 150 reduces the available power budget if the global power dispatcher 150 decides to allocate more power to a particular job 121 on request of the job-related agent 116.

Figure 2:
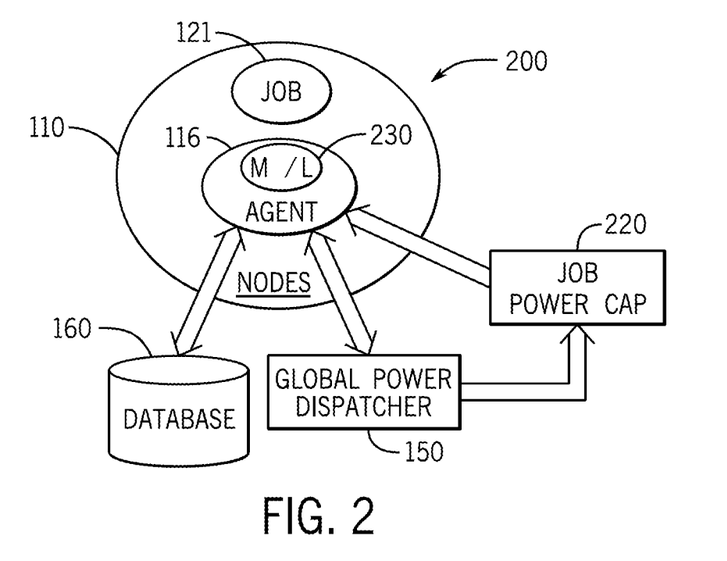
FIG. 2 is an illustration of the relationship between an agent, a job, nodes executing the job, and the global power dispatcher according to an example implementation.

FIG. 2 is an illustration 200 of the relationship between the agent 116, the job 121 and the nodes 110 upon which the job 121 and agent 116 execute. Referring to FIG. 2 in conjunction with FIG. 1, in accordance with some implementations, an agent 116 determines (e.g., periodically determines/re-determines or determines/re-determines in response to one of many potential triggering events) a footprint of an application during the execution of a job 121. In accordance with example implementations, determining a footprint means identifying a cluster that corresponds to a classification of the application and identifying a cluster that corresponds to a classification of the stage of the application.

As depicted in FIG. 2, for purposes of identifying the clusters, the agent 116 may include a machine learning engine 230. In general, the machine learning engine 230 may apply any of a different number of classification-type machine learning algorithms, such as a logistic regression algorithm, a naïve Bayes classifier algorithm, a k-nearest neighbors algorithm, a decision tree algorithm, a support vector machine algorithm, and so forth.

The agent 116 acquires data that represent the feature set that is provided as an input to the machine learning engine 230. The feature set may include any of a number of different features that may be used to characterize the execution of the job 121 on the executing nodes 110. As examples, these features may include a power consumption (e.g., a power consumption drive from a CPU supply voltage and supply current), a profiling counter count (e.g., a number of level one data cache misses, a number of level one instruction cache misses, a number of level two data cache misses, a number of level two instruction cache misses, a number of snoops, a number of cache load misses, a number of cache hits, a number of translation lookaside buffer (TLB) misses, and so forth.) As a further example, the features may include a number of non-uniform memory architecture (NUMA) misses.

In general, at a particular time, the node processing frequencies for a particular time comply with an existing job power cap 220 that is assigned by the global power dispatcher 150. When the agent determines a new performance footprint (which may correspond to a different optimal node processing frequency), the agent 116 may determine that the job power cap 220 should be adjusted. For example, the application associated with the job 220 may change from a preprocessing stage (e.g., a stage with initializing matrix multiplications and accessing data) to a processing stage, in which the nodes 110 process computationally-intensive operations (e.g., matrix multiplications). In other words, although the agent 116 may have determined that for the preprocessing stage of the application, a particular node processing frequency was optimal, due to the change in application stage, the agent 116 may now derive a different second footprint, which has a different optimal node processing frequency. The different optimal node processing frequency, in turn, may correspond to a power consumption that exceeds the existing job power cap 220 or falls significantly below the existing job power cap 220. For either case, the agent 116 may communicate with the global power dispatcher 150, as appropriate, to change, or modify, the job power cap 220, as further described herein.

Figure 3:
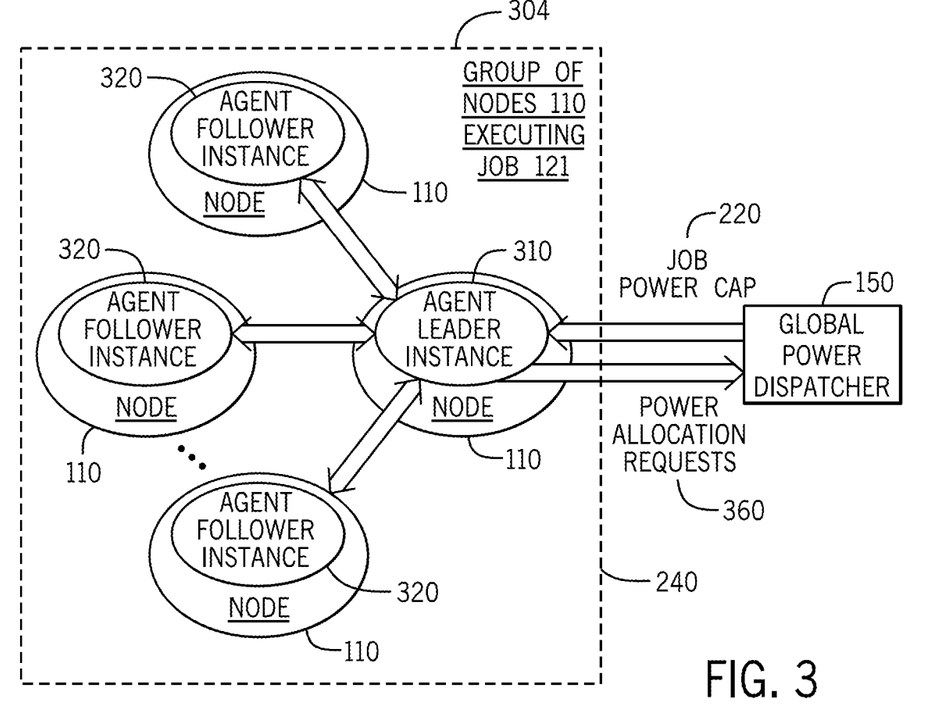
FIG. 3 is an illustration of the distribution of the agent among nodes executing a job according to an example implementation.

Referring to FIG. 3 in conjunction with FIGS. 1 and 2, in accordance with example implementations, the agent 116 is a distributed agent, which contains instances that execute on all of the nodes 110 on which the associated job 121 executes. More specifically, FIG. 3 depicts the distribution of an agent on a group 304 of nodes 110 that executed a job 121. As depicted in FIG. 3, in accordance with example implementations, the agent 116 includes an agent leader instance 310, which determines the performance footprints and communicates corresponding power requests 330, as appropriate, to the global power dispatcher 150. In accordance with some implementations, the agent leader instance 310 measures features of the node 110 upon which the instance 310 executes. Moreover, agent follower instances 320 execute on the other nodes 110 upon which the job 121 executes, acquire data representing features pertaining to the execution of the job 121 on each of these nodes 110, and communicate these features to the agent leader instance 310. The features from all of the nodes 110 that execute the job 121 (i.e., features based on performance data acquired by the agent leader instance 310 and features performance data acquired by the agent follower instances 320) provide a feature set. In accordance with example implementations, the agent leader instance 310 provides the feature set to its machine learning engine 230 for purposes of determining the performance footprint. Based on the performance footprint, the agent leader instance 310 may determine an optimal node processing frequency using, for example, the database 160.

In accordance with some implementations, the optimal node processing frequency may correspond to the same power limit for each node 110 executing the job; and the agent leader instance 310 may correspondingly communicate a power request 360 to the power dispatcher 150 to either request an increase or a decrease to the job power cap 220. Moreover, in accordance with some implementations, the agent 116 may determine not to modify the job power cap 220. In accordance with further example implementations, the optimal node processing frequency may correspond to power consumption limits that vary among the nodes 110 due to differences (e.g., different processing cores or performance benchmarks) of the nodes 110. For these implementations, the agent leader instance 310 may distribute the resulting power to the nodes 110 as appropriate. This may involve the agent leader instance 310 requesting more power from the global power dispatcher 150 or returning power to the power pool 120.

Figure 4A:
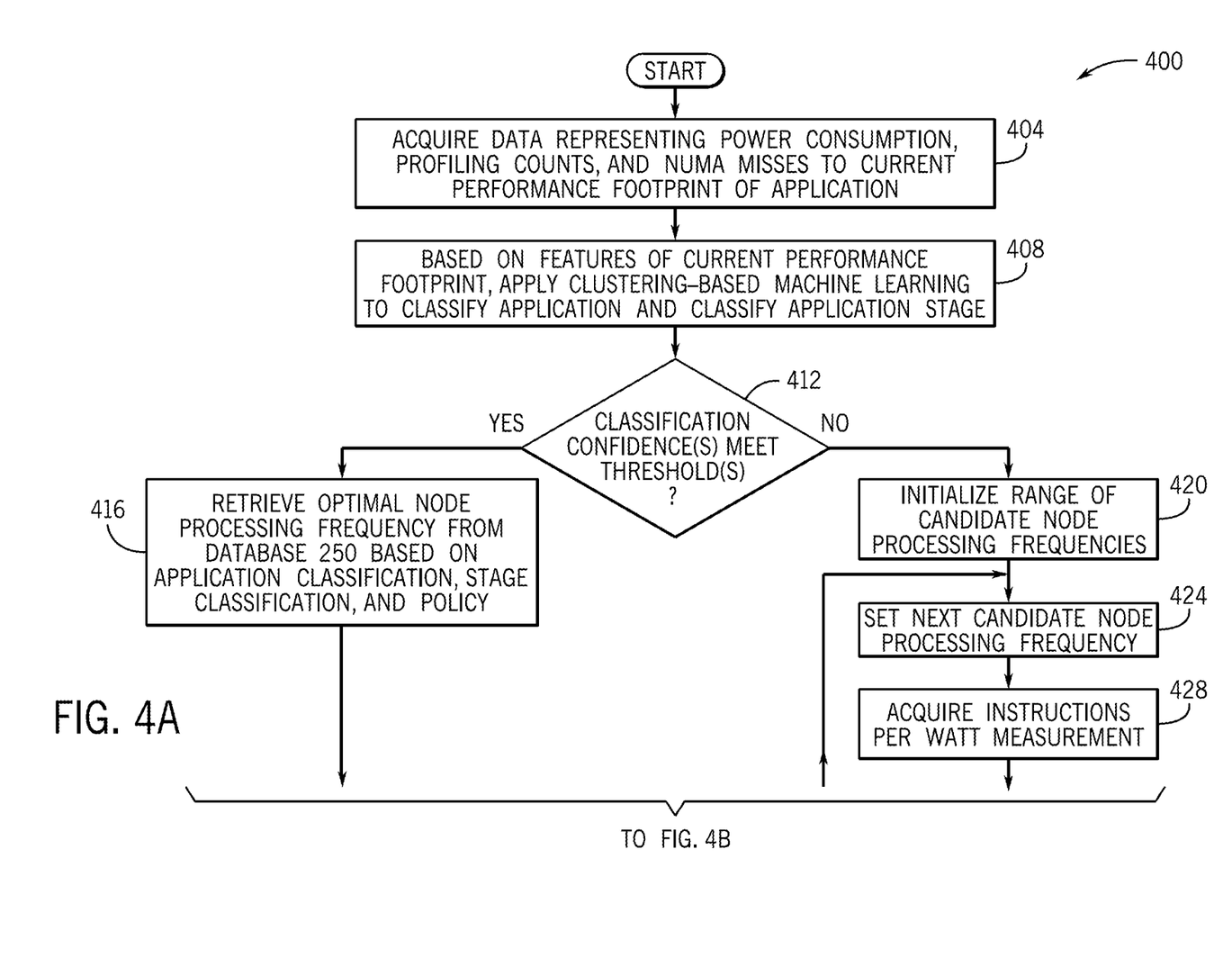
FIGS. 4A and 4B depict a flow diagram illustrating a process used by the agent to manage power for nodes executing a job according to an example implementation.
Figure 4B:
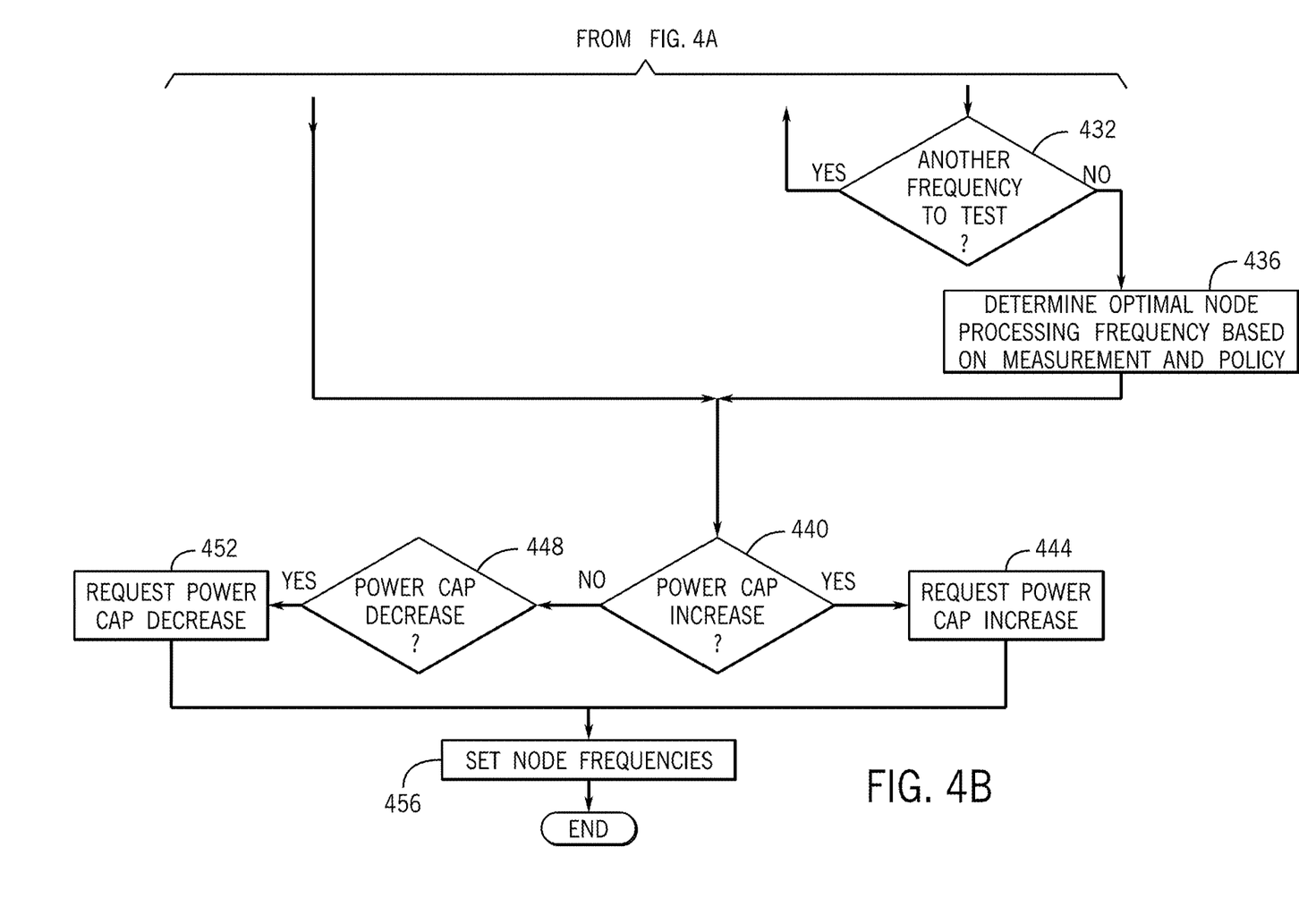

FIGS. 4A and 4B set forth a more detailed example of a process 400 that may be performed by the agent leader instance 310 in accordance with example implementations. Referring to FIG. 4A in conjunction with FIGS. 1 and 3, in accordance with some implementations, the process 400 includes the agent leader instance 310 acquiring (block 404) data, which represents various features of the nodes 110 that execute the associated job to derive a current performance footprint of the application. These features may include, for example, a power consumption, profiling counts and a count of NUMA misses.

Pursuant to block 408, the agent leader instance 310 may then, based on the features of the current performance footprint, apply clustering-based machine learning to classify the application and classify the application stage. This classification may include determining one or multiple confidences regarding the classification(s). For example, the agent leader instance 310 may determine a confidence of the application classification and a confidence of the application stage classification. Pursuant to decision block 412, the agent leader instance 310 may then determine whether the confidence(s) meet corresponding threshold(s). For example, in accordance with some implementations, the agent leader instance 310 may determine if a confidence provided by the machine learning engine is above eighty percent (as an example), then the agent leader instance 310 may proceed to block 416 to determine the optimal node processing frequency. However, if the confidence is below eighty percent (as an example), then the agent leader instance 310 may proceed to a sub-process (blocks 420 to 432 of FIGS. 4A and 4B) to empirically derive the optimal node processing frequency.

If the confidence(s) satisfy the threshold(s), then, pursuant to block 416, the agent leader instance 310 retrieves the optimal node processing frequency from the database 160 based on the application and stage classifications. Moreover, in accordance with some implementations, the selection of the optimal node processing frequency may also be based on a particular policy. For example, a particular policy for raising or decreasing power limits may be specific to a particular application or a particular group of users. For example, a licensed independent software vendor (ISV) application may always be run at maximum power limits for a reduced total cost of ownership (TCO).

If, pursuant to decision block 412, the confidence(s) do not meet specified confidence threshold(s), then the agent leader instance 310 initializes (block 420) a range of processing frequencies for an empirical test to determine the optimal node processing frequency. In this manner, after the initialization of block 420, the agent leader instance 310 sets (block 424) the next frequency from the range and observes, or acquires, a corresponding instruction per Watt measurement, pursuant to block 428. Referring also to FIG. 4B, this process continues by determining (decision block 432) if another frequency has not been tested, and if so, control returns to 424 to set and then evaluate (block 428) the next frequency. At the conclusion of this testing, the agent leader instance 310, pursuant to block 436, selects (block 432) the processing node frequency that corresponds to the maximum number of instructions per Watt. The agent leader instance 310 then determines (block 436) an optimal node processing frequency based on the measurement and policy.

In accordance with example implementations, the agent leader instance 310 determines (decision block 440) whether an increase in the power limit for the nodes that execute the job is to be increased for purposes of accommodating the new optimal node processing frequency. It is noted that this is the overall cap for the jobs 110 that execute the job, as the agent leader instance 310 may distribute the node power caps differently, depending on specific knowledge of the relationship between node power consumption and frequency of the nodes 110. If power is to be increased to support the new optimal node processing frequency, then, pursuant to block 444, the agent leader instance 310 requests a power limit increase, and assuming that the global power dispatcher grants the request, sets (block 456) the node processing frequencies. If, however, a power decrease is to occur (decision block 448), then, in accordance with example implementations, the agent leader instance 310 may return power to the power pool 120 (if a significant power consumption decrease has occurred) by requesting a power decrease from the global power dispatcher 150, before setting the new node frequencies, pursuant to block 456.

Figure 5:
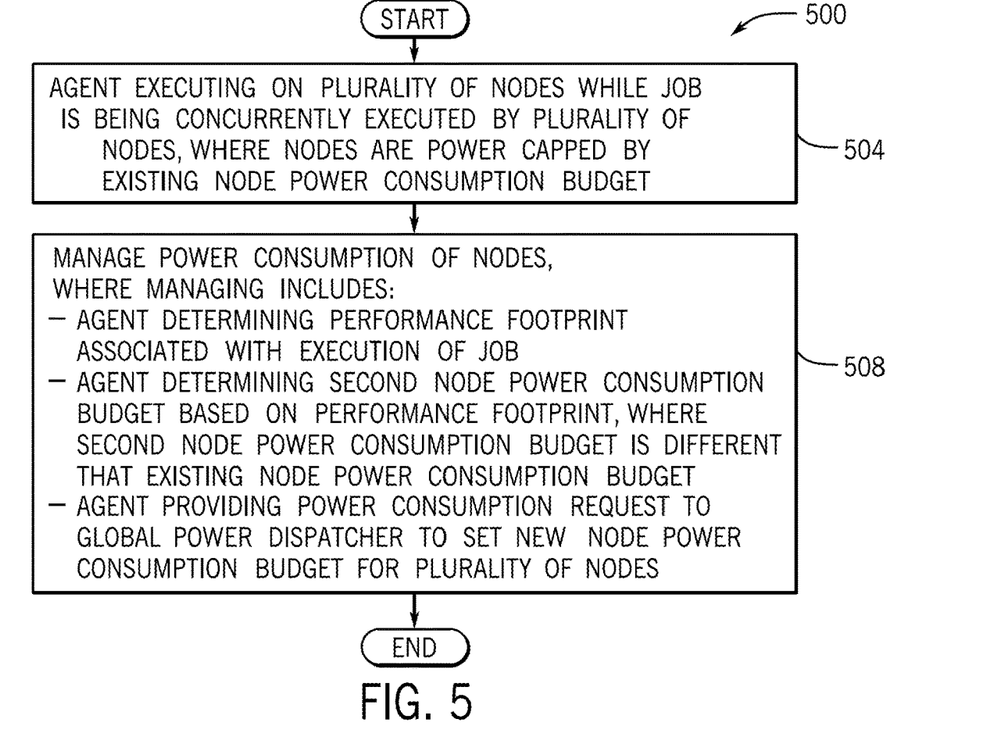
FIG. 5 is a flow diagram depicting a process to manage power consumption of a plurality of nodes using an agent that is executing on the nodes according to an example implementation.

Referring to FIG. 5, in accordance with example implementations, a technique 500 includes an agent executing (block 504) on a plurality of nodes while a job is being concurrently executed by the plurality of nodes. The plurality of nodes is power-capped by an existing node power consumption budget. The technique 500 includes managing (block 508) power consumption of the plurality of nodes. The managing includes the agent determining a performance footprint that is associated with execution of the job; and the managing includes the agent determining a second node power consumption budget based on the performance footprint. The second node power consumption budget is different than the existing node power consumption budget. The managing includes the agent providing a power consumption request to a global power dispatcher to set a new node power consumption budget for the plurality of nodes.

Figure 6:
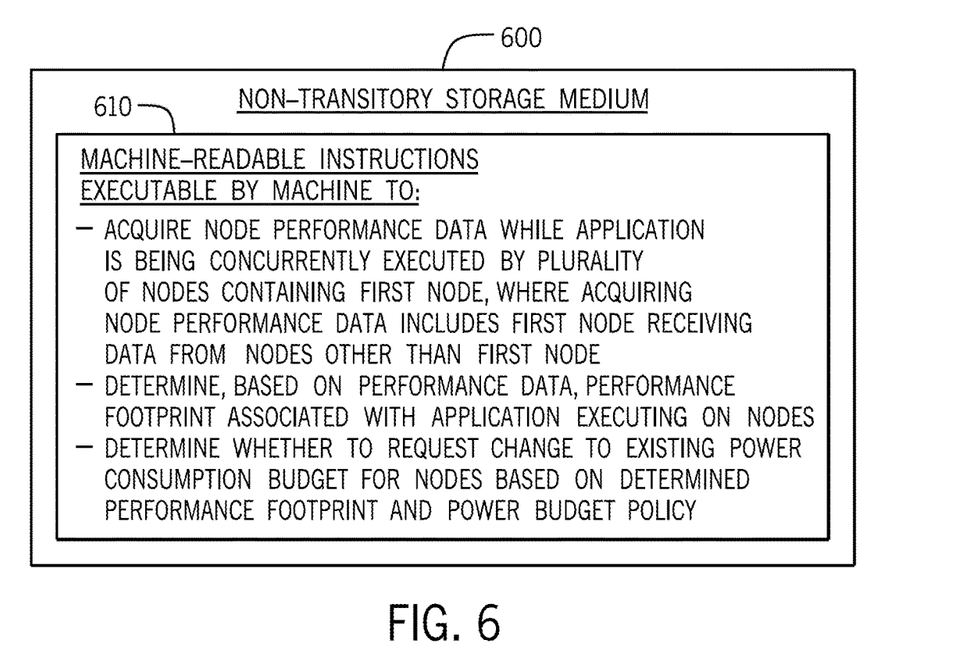
FIG. 6 is an illustration of a non-transitory storage medium storing machine executable instructions that, when executed by a machine, cause the machine to determine whether to request a change to an existing power consumption budget for nodes executing a job for an application based on a determined performance footprint associated with the application according to an example implementation.

Referring to FIG. 6, in accordance with example implementations, a non-transitory storage medium 600 stores machine-readable instructions 610. The instructions 610 are executable by a first node to cause the first node to acquire node performance data while a job associated with an application is being concurrently executed by a plurality of nodes containing the first node. The plurality of nodes is power-capped by an existing node power consumption budget, and acquiring the node performance data includes the first node receiving data from nodes of the plurality of nodes other than the first node. The instructions 610, when executed by the first node, further cause the first node to determine, based on the performance data, a performance footprint that is associated with the application; and determine whether to request a change to an existing node power consumption budget based on the determined performance footprint and a power consumption policy.

Figure 7:
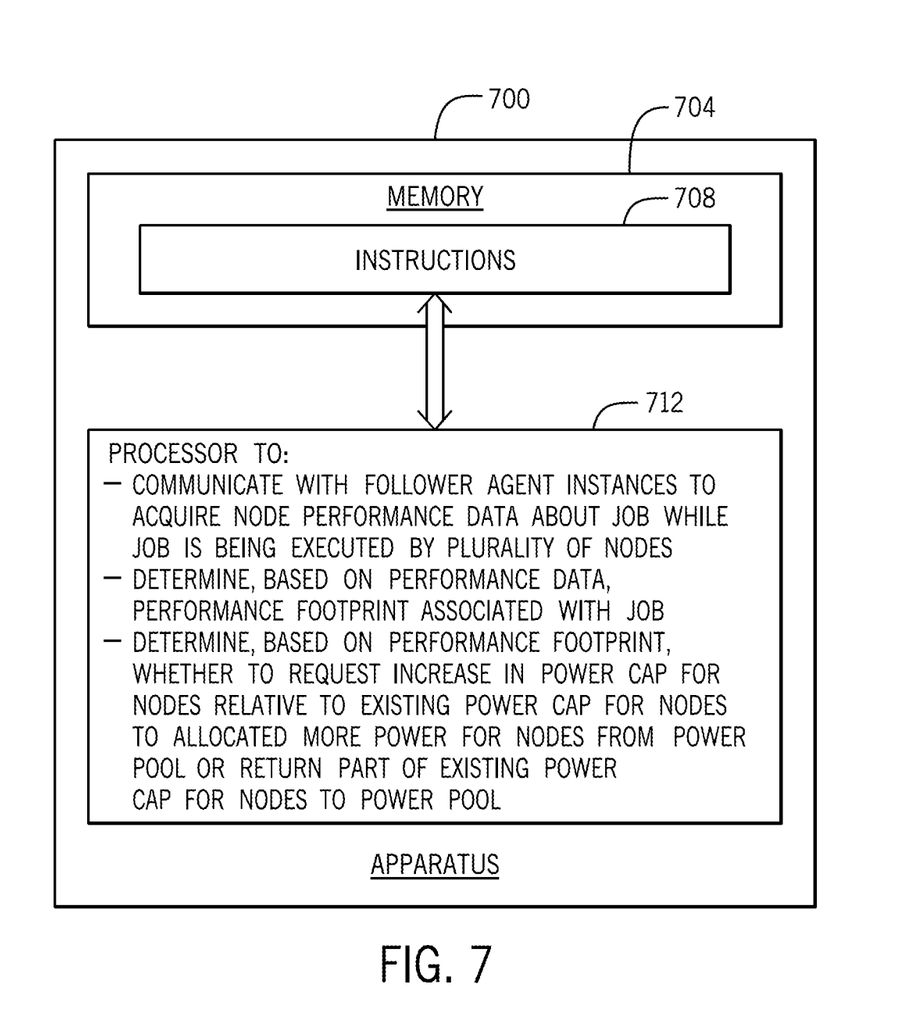
FIG. 7 is a schematic diagram of an apparatus that includes a processor to, based on a performance footprint associated with a job, determine whether to request an increase in an existing power consumption budget for a job or return part of the existing power consumption budget to a power pool according to an example implementation.

Referring to FIG. 7, in accordance with example implementations, an apparatus 700 includes a processor 712 and a memory 704 to store instructions 708. The processor 712 is associated with a first node of a plurality of nodes, and the plurality of nodes is associated with a job. The first node executes a leader instance of an agent, and each node of the plurality of nodes other than the first node executes a follower instance of the agent. The instructions 708, when executed by the processor 712, cause the processor 712 to communicate with the follower instances to acquire node performance data about the job while the job is being executed by the plurality of nodes. The instructions 708, when executed by the processor 712, further cause the processor to determine, based on the performance data, a performance footprint that is associated with the job. The instructions 708, when executed by the processor 712, further cause the processor to determine, based on the performance footprint, whether to request an increase in a node power consumption budget relative to an existing node power consumption budget from a power pool or return part of the existing power consumption budget to the power pool.

In accordance with example implementations, the technique further includes the global power dispatcher granting the power consumption request. The global power dispatcher increases or decreases a power budget in response to granting the power consumption request. A particular advantage is that global power apportionment is controlled by the global power dispatcher, while the agent determines power apportionment among the nodes executing the job based on features of the application associated with the job.

In accordance with example implementations, the technique further includes one of the global power dispatcher or the agent setting the new node power consumption budget in response to the global power dispatcher granting the power consumption request. A particular advantage is that the existing node power consumption budget may be modified based on specific features of the application and its stage.

In accordance with example implementations, the technique further includes the agent acquiring node performance data associated with executing the job. Determining the performance footprint includes the agent determining the performance footprint based on the performance data. A particular advantage is that power is allocated in a way that minimizes the impact of power-capping on application performance.

In accordance with example implementations, the technique includes an agent performing cluster-based machine learning to classify an application that is associated with the job, and the agent determining the footprint based on the classification. A particular advantage is that a stage of an application under evaluation may be classified without knowledge about features of the specific application.

In accordance with example implementations, the technique includes the agent performing clustering-based machine learning to classify a stage of an application that is associated with the job, and the agent determining the footprint based on the classification. A particular advantage is that a stage of an application under evaluation may be classified without knowledge about features of the specific application.

In accordance with example implementations, the agent executing on the plurality of nodes includes agent follower instances executing on a group of nodes of the plurality of nodes and accessing first performance data for the group of nodes. The technique includes an agent leader instance executing on a given node of the plurality of nodes, receiving first data from the group of nodes, accessing second data representing second performance data for the given node, and determining the performance footprint based on the first data and the second data. A particular advantage is that the power-capping may be performed in a manner that minimizes the impact on job execution performance.

In accordance with example implementations, the technique may include an agent determining in an application classification stage an application stage classification based on the performance data. The technique includes the agent determining the power consumption footprint based on the determined application and the determined application stage classification, and the application determines a node processing core frequency based on the determined power consumption footprint. A particular advantage is that an optimal node processing core frequency may be determined for similar applications and application stages, without knowledge of the specific features of the applications or their stages.

In accordance with example implementations, the agent determines the node processing core frequency by accessing a database correlating the node processing core frequency to the determined performance footprint. A particular advantage is that an optimal node processing core frequency may be determined for similar applications and application stages, without knowledge of the specific features of the applications or their stages.

In accordance with example implementations, the technique further includes the agent determining an application classification and an application stage classification based on the performance data. Based on at least one of a confidence in the determined application classification or a confidence in the determined application stage classification, the agent may perform the following. The agent may adjust a node processing core frequency over a range of candidate node processing core frequencies; determine a performance footprint for each node processing core frequency of the range; observe a number of instructions processed per unit of power for each candidate node processing core frequency of the range; and select a candidate node processing core frequency of the range based on a result of the observation. A particular advantage is that even if the agent is unable to classify the application and/or application stage according to a particular confidence level, the agent may still determine an optimal node processing core frequency.

In accordance with example implementations, the technique may further include updating a database with the selected node processing core frequency and the determined performance footprint. A particular advantage is that even if machine learning cannot be used to determine an optimal node processing core frequency, the results from an empirical test performed by the agent may be used to update a database that correlates optimal node processing core frequencies and corresponding performance footprints.

In accordance with example implementations, the technique includes a scheduler scheduling the job on the plurality of nodes. The scheduling includes the scheduler determining an initial node power consumption budget for the job. The scheduler determines the initial node power consumption budget by multiplying the number of the plurality of nodes by a predetermined power value. The scheduling includes the scheduler determining if the initial node power consumption budget is within an available power budget set by the global power dispatcher; and in response to determining that the initial node power consumption budget is within the available power budget, the scheduler scheduling the job and setting the initial power consumption budget for the job. A particular advantage is that power may be treated as a schedulable resource.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
an agent distributed over and executing on a plurality of nodes while a job is being concurrently executed by the plurality of nodes, wherein the plurality of nodes is power-capped by an existing node power consumption budget; and
managing power consumption of the plurality of nodes, wherein the managing comprises:
the agent determining a performance footprint associated with execution of the job, wherein an application is associated with the job, the application transitions through multiple stages, and the performance footprint characterizes a current stage of the multiple stages;

the agent determining a second node power consumption budget based on the performance footprint, wherein the second node power consumption budget is different than the existing node power consumption budget; and the agent providing a power consumption request to a global power dispatcher to set a new node power consumption budget for the plurality of nodes.

2. The method of claim 1, further comprising:
the global power dispatcher granting the power consumption request, wherein the global power dispatcher increases or decreases a power budget associated with the job in response to granting the power consumption request and reduces or increases the available power for job related power domains managed by the global power dispatcher in response to granting the power consumption request.

3. The method of claim 2, further comprising either the global power dispatcher or the agent setting the new node power consumption budget in response to the global power dispatcher granting the power consumption request.

4. The method of claim 1, further comprising the agent acquiring node performance data associated with executing the job, wherein agent determining the performance footprint comprises the agent determining the performance footprint based on the performance data.

5. The method of claim 4, further comprising the agent performing clustering-based machine learning to classify the application based on the performance data, and the agent determining the performance footprint based on the classification.

6. The method of claim 4, further comprising the agent performing clustering-based machine learning to classify the current stage, and the agent determining the performance footprint based on the classification.

7. The method of claim 1, wherein the agent executing on the plurality of nodes comprises:
agent follower instances executing on a group of nodes of the plurality of nodes and accessing first performance data for the group of nodes; and
an agent leader instance executing on a given node of the plurality of nodes other than the group of nodes, receiving the first data from the agent follower instances, accessing second data representing second performance data for the given node, and determining the performance footprint based on the first performance data and the second performance data.

8. The method of claim 1, further comprising:
the agent determining an application classification and an application stage classification based on performance data;
the agent determining the performance footprint based on the determined application classification and the determined application stage classification; and
the agent determining a node processing core frequency based on the determined performance footprint.

9. The method of claim 8, wherein the agent determining the node processing core frequency comprises the agent accessing a database correlating the node processing core frequency to the determined performance footprint.

10. The method of claim 1, further comprising:
the agent determining an application classification and an application stage classification based on performance data associated with executing the job; and based on at least one of a confidence in the determined application classification or a confidence in the determined application stage classification, the agent:
adjusting a node processing core frequency at each candidate node processing core frequency of a plurality of candidate node processing core frequencies;
determining a performance footprint for each candidate node processing core frequency of the plurality of candidate node processing core frequencies;
observing a number of instructions processed per unit of power for each candidate node processing core frequency of the plurality of candidate node processing core frequencies; and
selecting a candidate node processing core frequency of the plurality of candidate node processing core frequencies based on a result of the observation.

11. The method of claim 10, further comprising updating a database with the selected node processing core frequency and the determined performance footprint corresponding to the selected node processing core frequency.

12. The method of claim 1, further comprising:
a scheduler scheduling the job on the plurality of nodes, wherein the scheduling comprises:
the scheduler determining an initial node power consumption budget for the job, wherein the scheduler determining the initial node power consumption budget comprises the scheduler multiplying the number of the plurality of nodes by a predetermined power value;
the scheduler determining if the initial node power consumption budget is within an available power budget set by the global power dispatcher; and
in response to determining that the initial node power consumption budget is within the available power budget, the scheduler scheduling the job and setting the initial power consumption budge for the job.

13. The method of claim 1, wherein the multiple stages include at least one of a preprocessing stage, a processing stage, an input stage or an output stage.

14. A non-transitory storage medium that stores machine-readable instructions that, when executed by a first node, cause the first node to:
acquire node performance data while a job associated with an application is being concurrently executed by a plurality of nodes containing the first node, wherein the plurality of nodes is power-capped by an existing node power consumption budget, and acquiring the node performance data comprises the first node receiving data from nodes of the plurality of nodes other than the first node;
determine, based on the performance data, a performance footprint associated with the application, wherein the application transitions through multiple stages, and the performance footprint characterizes a current stage of the multiple stages; and
determine whether to request a change to an existing node power consumption budget based on the determined performance footprint and a predefined power consumption policy.

15. The non-transitory storage medium of claim 14, wherein the power consumption policy comprises a policy associated with at least one of a user associated with the application or a policy associated with the application.

16. The non-transitory storage medium of claim 14, wherein the storage medium further stores machine-readable instructions that, when executed by the first node, cause the first node to:

perform clustering-based machine learning to classify the application and classify the current stage; and determine the performance footprint based on the classification of the application and the classification of the stage of the application.

17. An apparatus comprising:

a processor associated with a first node of a plurality of nodes, wherein the plurality of nodes is associated with a job, the first node executes a leader instance of an agent, and each node of the plurality of nodes other than the first node executes a follower instance of the agent; and a memory to store instructions that, when executed by the processor, cause the processor to:

communicate with the follower instances to acquire node performance data about the job while the job is being executed by the plurality of nodes;

determine, based on the performance data, a performance footprint associated with the job, wherein an application is associated with the job, the application transitions through multiple stages, and the performance footprint characterizes a current stage of the multiple stages; and determine, based on the performance footprint, whether to request an increase in a node power consumption budget relative to an existing node power consumption budget from a power pool or return part of the existing power consumption budget to the power pool.

18. The apparatus of claim 17, wherein the performance data comprises, for a given node of the plurality of nodes, data representing at least one of a power consumption associated with execution of the job on the given node, a profiling counter count associated with the execution of the job on the given node, and a count of non-uniform memory architecture (NUMA) misses associated with the execution of the job on the given node.

19. The apparatus of claim 17, wherein the memory further stores instructions that, when executed by the processor, further cause the processor to:

determine an application classification and an application stage classification based on the performance data;

determine the performance footprint based on the determined application classification and the determined application stage classification; and determine a node processing core frequency based on the determined performance footprint.

20. The apparatus of claim 19, wherein the memory further stores instructions that, when executed by the processor, further cause the processor to access a database correlating the node processing core frequency to the determined performance footprint.

21. The apparatus of claim 17, wherein the memory further stores instructions that, when executed by the processor, further cause the processor to:

determine an application classification and an application stage classification based on the performance data; and in response to at least one of a confidence in the determined application classification or a confidence in the determined application stage classification being below a predefined threshold:

adjust a node processing core frequency at each candidate node processing core frequency of a plurality of candidate node processing core frequencies;

determine a performance footprint for each candidate node processing core frequency of the plurality of candidate node processing core frequencies;

observe a number of instructions processed per unit of power for each candidate node processing core frequency of the plurality of candidate node processing core frequencies; and select a candidate node processing core frequency of the plurality of candidate node processing core frequencies based on the result of the observation.

\* \* \* \* \*